Feb. 21, 1956   H. F. EMERY ET AL   2,735,334
INDEXING DEVICE
Filed April 16, 1952   2 Sheets-Sheet 1
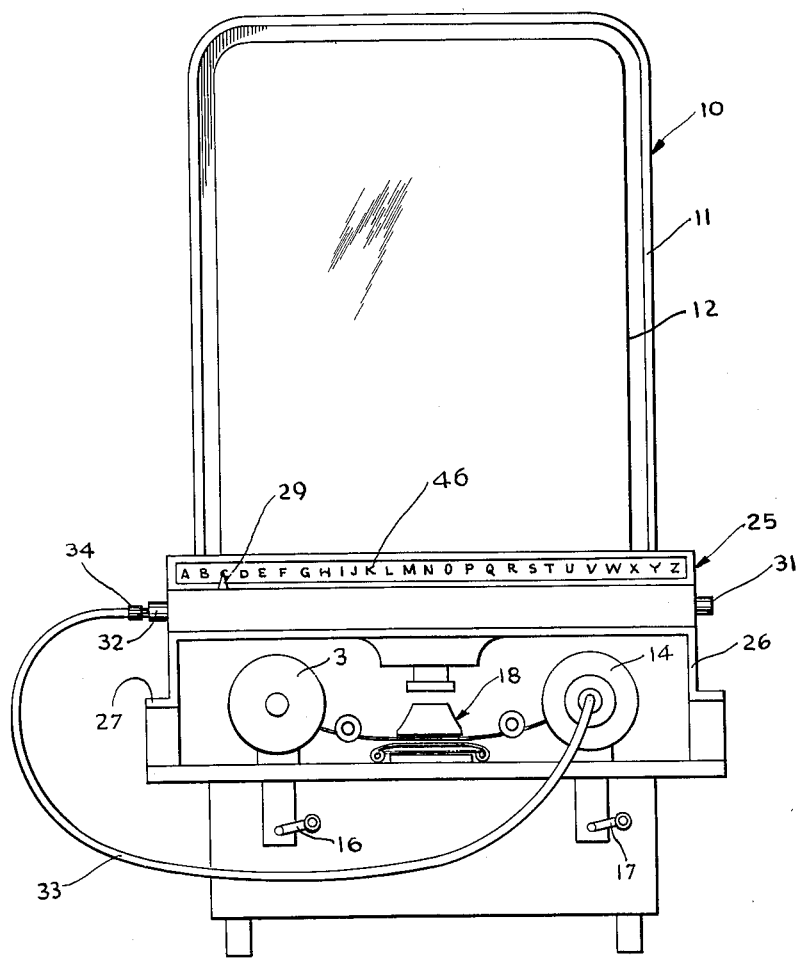
fig 1
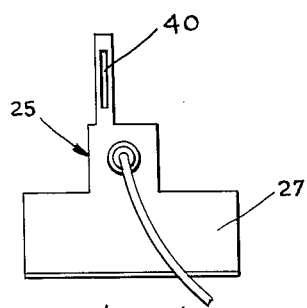
fig 4
INVENTORS
HERBERT F. EMERY
DONALD E. PERU
ATTORNEY

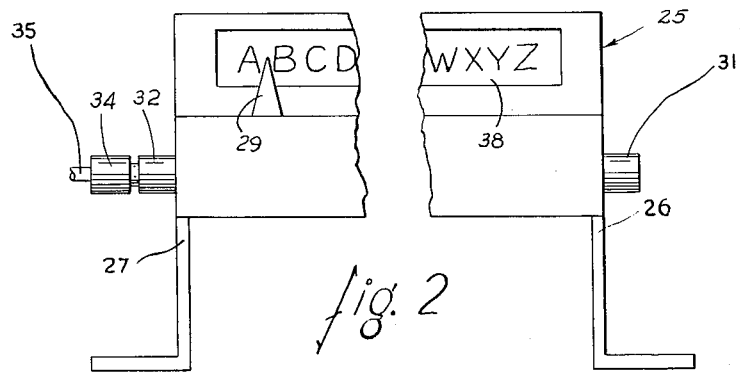
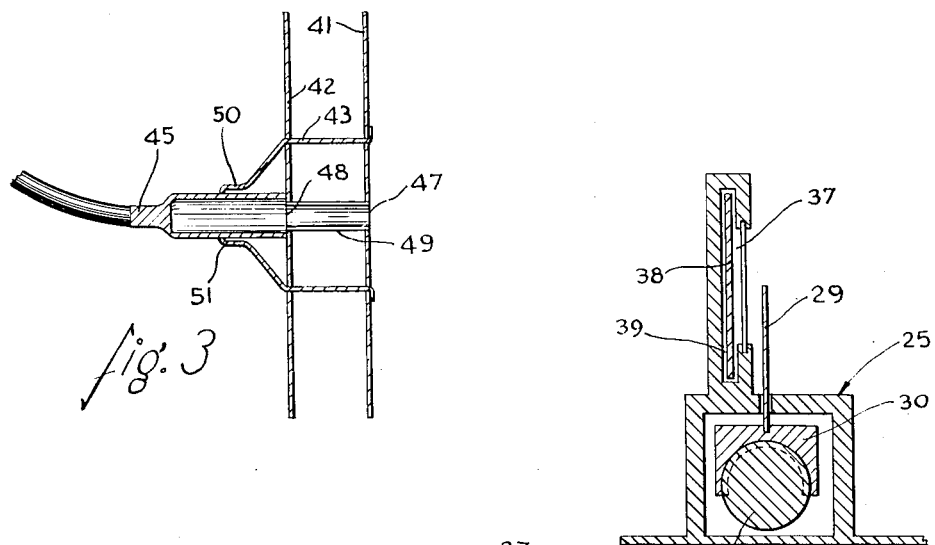
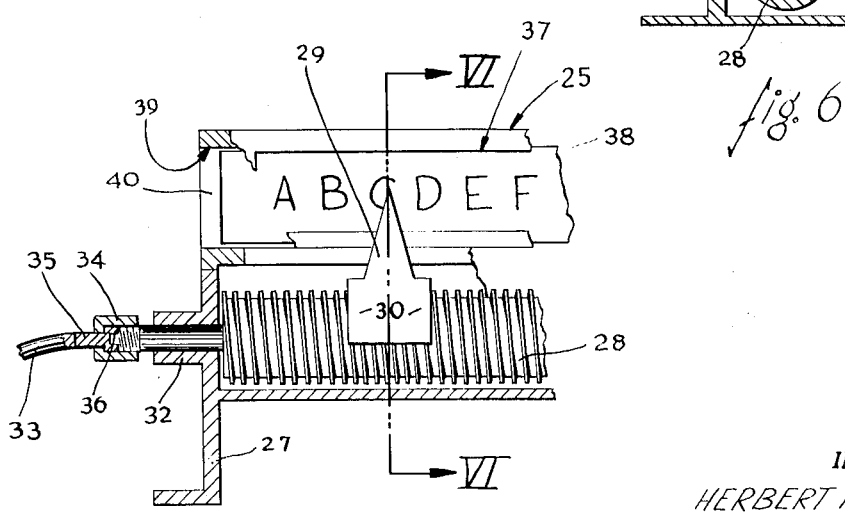

United States Patent Office 2,735,334
Patented Feb. 21, 1956

2,735,334

INDEXING DEVICE

Herbert F. Emery, White River Township, Muskegon County, and Donald E. Peru, Fruitport, Mich.

Application April 16, 1952, Serial No. 282,724

2 Claims. (Cl. 88—24)

This invention relates to a machine for the convenient indexing of microfilm so that return to the same spot in a roll of such film may be readily accomplished. While many applications may be made for our device, it is especially adapted to the use of quickly locating data arranged in alphabetical, numerical, or other order on a roll of microfilm.

Previously proposed methods for indexing microfilm have involved photographing indexing indicia directly on the film. Such a method of indexing involves a considerable lengthening of the film where a detailed breakdown is needed in the indexing, and necessitates stopping the film to read the indexing indicia. In our device, the film need not be stopped until a predetermined indexing point is reached, thereby saving much time where many entries are to be looked up.

One limitation to all devices which use indicia on the film itself is that the film must be indexed at the time it is made. Such devices cannot be used with film which was exposed and developed before the desirability of indexing it was realized. Some device is needed which will enable old microfilm to be indexed when and as desired. Since large stocks of microfilm records are already in existence which were made without any provision for indexing, the possibility of indexing this old film is an important factor in evaluating any indexing method.

Microfilm has been found to be a very convenient means for condensing records which are "dead storage," that is are very rarely referred to, in which case the extra time spent in locating a particular frame of film is not an important factor. However, microfilm will be just as useful for live storage where there will be much more occasion to refer to it, provided the time required to find a given entry can be cut down by the use of a suitable indexing system.

Our indexing mechanism is adapted for attaching to a conventional microfilm reader although it may be built as an integral part of such a reader at the time of manufacture and may also be used in other applications. It is especially adapted to cooperate with existing microfilm readers as now manufactured and to be usable without making mechanical changes on such readers.

Such a device must so operate as to permit a particular spot on a roll of film to be quickly found on replacing the film on the reader after it has been rolled up and in storage for some time.

One difficulty with mechanical arrangements for accomplishing this is that a single turn of a reel carrying film does not represent any particular length of film or number of frames, these factors being proportional to the radius of the roll. Also, the winding reel and the idling reel do not always turn at the same speed. These two speeds may vary greatly at times, a fact which complicates the problem of adding any indicating mechanism.

It is then an object of this invention to provide an indexing device for use with microfilm readers and similar mechanisms.

It is a further object of this invention to provide such an indexing device which can be attached to existing microfilm readers and similar devices without any change in the construction of the microfilm reader.

Another object of this invention is to provide an indexing device which will effect a saving of time over previous devices.

An additional object of this invention is to provide an indexing device that can be used with microfilm which is not already provided with any means of indexing.

Other and further objects of this invention will be apparent from this specification and claims and the accompanying drawings.

As shown on the drawings:

Figure 1 is a front elevational view of a microfilm reader having our device attached thereto.

Figure 2 is a partially broken, enlarged view of a fragment of Figure 1.

Figure 3 is a central, sectional view of the reel used in our device.

Figure 4 is an end elevation view of our device taken from the leftward end of the device as appearing in Figure 1.

Figure 5 is a view of a fragment of Figure 2, with parts broken away and shown in section.

Figure 6 is a sectional view taken along the line VI—VI of Figure 5.

A conventional microfilm viewer or reader to which our indexing device is attached is shown generally at 10 in Figure 1. This comprises a case 11, a viewing screen 12, a driven reel 13 and a takeup reel 14 containing the microfilm 15 and rotated by cranks 16 and 17. The cranks 16 and 17 are attached to opposite ends of the same shaft and the use of two cranks is a matter of convenience. The film 15 passes through a framing mechanism and lens system at 18 whereby the images on the film 15 are projected onto the screen 12. This microfilm reader and the parts so far described are well known in the art and do not, taken by themselves, form a part of our invention, and so will not be described in further detail, the above description being deemed sufficient to an understanding of the manner in which our indexing device attaches to the the microfilm reader 10 and cooperates therewith.

In its preferred form, our indexing device comprises a frame 25 having feet or other supporting members 26 and 27 which may be used to support our device when it is not mounted directly on the frame of the microfilm reader 10. Extending the length of the frame 25 is a feed screw 28. A hand or pointer 29 is carried upon said feed screw 28 by a half-nut 30. The feed screw 28 is supported at either end by bearings 31 and 32, and is driven by a flexible shaft 33 which is attached to said feed screw 28 by a nut 34. The cable or shaft 33 has a terminal piece 35 which is keyed to the screw 28 as shown at 36.

A recess 37 is provided in the frame 25 to receive a card or strip or other indicia carrying surface 38. The lower portion 39 of the recess 37 receives and holds the said card 38 which carries letters, numerals or other indicia as shown at 46. The card or strip 38 may be placed in position or removed through a slot 40.

The flexible shaft 33 is attached to a reel 14 so that the speeds of rotation of the reel and shaft coincide. The reel 14 comprises two sides 41 and 42 which are held in proper relationship by a series of spacers 43 which extend through the side 42 and are welded or otherwise attached to a terminal piece 45 of the flexible shaft 33 as shown at 50 and 51. The construction of the reel 14 may vary somewhat to meet the requirements of the individual viewer or reader with which it will be used, but in general in addition to the details already described there will be a hole 47 in the side 41 and a hole 48 in the side 42 and there may also be a tube connecting these two holes as at 49. This construction permits the placing of the reel 14 on a spindle provided for that purpose on the viewer 10.

The hole 47 is square while hole 48 is round, this being the construction that fits conventional film readers. However, we contemplate constructing our reel 14 to fit whatever type of shaft may be used in such readers. Any suitable means may be used to hold the reel 14 on the shaft, such means usually being a part of the microfilm reader 10.

The half-nut 30 may, if desired, be a whole nut or any other arrangement that will ride satisfactorily upon the screw 28.

While our machine may be incorporated into microfilm readers at the time of their manufacture, we contemplate that it will also be used as an attachment to existing readers. In some instances, the user will be renting the reader and not having title to it, he will not be at liberty to alter its construction by attaching our device thereto as shown in Figure 1. In such a case, our device may be mounted on a table or other surface by means of the feet 26 and 27 and the reel 14 may be substituted for the original take-up reel so that the reader is not permanently altered in any way. By take-up reel, we mean an empty reel supplied with a microfilm viewer and similar to our reel 14 except that there is no connection with any flexible cable. This take-up reel is used to reel up the film 15 as it is reeled off of a reel 13 which is the reel upon which the film 15 is stored when not in use, and is of course changed when different films are placed on the viewer. It will be understood that in many such microfilm readers, the power may be applied alternately to either reel, as is necessary to give the desired motion to the film 15.

One important function of our arrangement including a flexible shaft is that in many such viewers the entire film handling mechanism is movable with respect to the screen 12 being revolvable about a vertical axis to aid in the proper framing of the film on the said viewing screen.

While we have called our designation strip 38 a strip or card, we do not propose to be limited thereby to any specific shape, proportion, or material because other media made in other shapes and proportions may serve the purpose of carrying the indicia 46 which may be written with pen or pencil, stamped, punched, printed, or made by any other means which will place a mark or designation where it will bear a proper relationship to the pointer 29. Likewise, indicator of other shapes and styles may designate which of the indicia 46 refers to the part of the film 15 being viewed on the screen 12. The strip 38 and the indicators 29 may be moved relative to each other by our mechanism to accomplish that purpose.

One of the important advantages of our invention is its great flexibility. It may be used in any microfilm application. The divisions shown on our designation surface 38 may not only be alphabetical or numerical, but when the need arises, they may be geographical, chronological, or any other convenient order and the indexing may be done either closely or loosely as desired. Another advantage is that a new designation surface 38 may be made marking other subdivisions of the film as the need arises. The designation strip 38 may conveniently be stored by wrapping it around the roll of film to which it pertains.

Also, while we have shown and described our indexing device as applied to a microfilm reader in which the reels 13 and 14 are driven by hand power, it is equally serviceable when attached to a reader in which the reels 13 and 14 are driven by a motor.

We are aware, therefore, that many changes may be made, and numerous details of construction may be varied through a wide range without departing from the principles of our invention, and we, therefore, do not propose limiting the patent granted hereon otherwise than is necessitated by the prior art.

We claim as our invention:

1. In a structure for determining the location of a portion of a film reel, the combination comprising: a micro-film reader having a film take-up spindle and means for actuating said spindle; an indexing device usable with said micro-film reader and mounted externally thereof, said indexing device including: an elongated frame having a pair of end members, a screw rotatably supported at its opposite ends upon and between said end members, an indicia strip and means removably mounting same upon said frame parallel with and adjacent to said screw, a rider having means thereon engaging said screw for movement lengthwise thereof upon rotation of said screw, an indicator on said rider extending partially across said strip, a reel mountable upon and rotatable with said spindle, and a flexible cable co-axially secured at one end thereof to said reel, the other end of said cable being secured to one end of said screw.

2. In a structure for determining the location of a portion of a film reel, the combination comprising: a microfilm reader having a film take-up spindle and means for actuating said spindle; an indexing device for use with said micro-film reader means and mounting said device externally of said micro-film reader, said indexing device including: an elongated frame, said frame including an upper portion with a longitudinally extending recess therein for receiving an indicia strip and an opening in a wall of said upper portion through which said strip may be viewed, said frame including a lower portion, said lower portion having a step below said opening, a slot in said step extending longitudinally of said frame, a screw rotatably supported in said lower portion of said frame and below said step, said screw being parallel with said indicia strip, a rider having means thereon engaging said screw for movement lengthwise thereof upon rotation of said screw, an indicator on said rider extending upwardly through said slot and partially across said strip, a reel mountable upon and rotatable with said spindle, and a flexible cable co-axially secured at one end thereof to said reel, the other end of said cable being secured to one end of said screw.

References Cited in the file of this patent

UNITED STATES PATENTS

| | | |
|---|---|---|
| 808,048 | Hallwood | Dec. 19, 1905 |
| 1,500,685 | Roberts | July 6, 1924 |
| 1,630,029 | Rippingille | May 24, 1927 |
| 1,987,997 | Drake et al. | Jan. 15, 1935 |
| 2,464,220 | Duncan et al. | Mar. 15, 1949 |
| 2,497,606 | Herrmann | Feb. 14, 1950 |
| 2,518,209 | Whipple et al. | Aug. 18, 1950 |